United States Patent [19]
Bak et al.

[11] Patent Number: 5,306,470
[45] Date of Patent: Apr. 26, 1994

[54] CONICAL MICROLITH CATALYTIC REACTION SYSTEM

[75] Inventors: Michael J. Bak, White Lake; Thomas A. Culbertson, Orchard Lake, both of Mich.

[73] Assignee: Williams International Corporation, Walled Lake, Mich.

[21] Appl. No.: 85,590

[22] Filed: Jul. 1, 1993

Related U.S. Application Data

[63] Continuation-in-part of Ser. No. 872,342, Apr. 23, 1992, Pat. No. 5,246,672.

[51] Int. Cl.⁵ .............. F01N 3/10; B01D 50/00; B01J 21/04
[52] U.S. Cl. .................. 422/174; 422/177; 422/180; 60/299; 60/300; 502/439; 502/527
[58] Field of Search .............. 422/174, 177, 180; 60/299, 300; 502/439, 527

[56] References Cited

U.S. PATENT DOCUMENTS

| | | | |
|---|---|---|---|
| 3,770,389 | 10/1973 | Kitzner et al. | 422/180 |
| 4,388,275 | 6/1983 | Fratzer et al. | 422/180 |
| 4,576,799 | 3/1986 | Wörner et al. | 422/176 |
| 4,987,034 | 1/1991 | Hitachi et al. | 428/180 |
| 5,051,241 | 9/1991 | Pfefferle | 422/180 |
| 5,070,694 | 12/1991 | Whittenberger | 60/300 |
| 5,171,341 | 12/1992 | Merry | 422/176 |
| 5,174,969 | 12/1992 | Fischer et al. | 422/180 |
| 5,246,672 | 9/1993 | Bak | 422/174 |
| 5,248,482 | 9/1993 | Bloom | 422/174 |

Primary Examiner—James C. Housel
Assistant Examiner—N. Bhat
Attorney, Agent, or Firm—Lyman R. Lyon

[57] ABSTRACT

A conical microlith catalyst reaction system for use in automotive catalytic converters or gas turbine catalytic combustors advantageously utilizes a microlith catalyst bed formed from a wire cloth (10) woven into a spiral wound flat helix (or coil). The spiral windings of the wire cloth helix are wound to form a uniform angle less than 90° relative to a ceramic housing formed from an inner ceramic hub (102) and an outer ceramic shroud (104). Warp wires (12) further carry electrical current via bus bars (106, 108) for electrically heating the catalyst bed. Lightoff time for the bed is significantly reduced due to the heating. The angled spiral windings create the conical shape to prevent buckling of the spiral windings due to thermal stress caused by the microlith catalyst bed becoming hot.

7 Claims, 3 Drawing Sheets

CONICAL MICROLITH CATALYTIC REACTION SYSTEM

This application is a continuation-in-part of Ser. No. 07/872,342, filed on Apr. 23, 1992 now U.S. Pat. No. 5,246,672.

BACKGROUND OF THE INVENTION

The present invention relates generally to catalytic reaction systems, and more particularly to microlith catalyst beds for improving catalytic conversion efficiency.

In the past, typical catalytic convertors for oxidation of carbonaceous fuels, for example as used in automotive emissions, have used unitary structures such as an assembly of interlocking sheets of catalyst material to form a catalyst bed. This type of structure is referred to as a monolith catalyst. However, the performance of monolith catalysts have been limited by the fact they are not generally effective until the catalyst has heated up to its operating temperature. Monolith catalysts suffer from long warmup (lightoff) time. Further, they generally do not provide satisfactory high catalytic conversion efficiency.

In U.S. Pat. No. 5,051,241, William C. Pfefferle, discloses a microlith catalytic reaction system which provides a more effective catalytic conversion than conventional monolith converters when operating in what is known as the mass transfer limited region of catalyst operation. In the mass transfer limited region of operation, the reacting chemical species must diffuse through a boundary layer and reach the catalyst surface for the catalyst to be effective in its function of accelerating reaction rates. The microlith catalyst system of Pfefferle provides quicker lightoff and higher conversion efficiency due to high open area microlith catalyst elements having flow channels with a flow path length no longer than about two times the diameter of the largest flow channel. Pfefferle further teaches the ability to electrically heat the microlith catalyst to further reduce the lightoff time.

The system of Pfefferle utilizes multiple layers of microlith catalyst support to obtain the total surface area required to achieve the desired reaction rate. To provide the electrical heating, an electrical path can be implemented by either a series connection passing through each layer of microlith catalyst with jumper connections between each layer, or a parallel connection where a common power bus connects all layers to the power supply. Both of these wiring configurations require numerous electrical connections that drive up cost and reduce reliability of the system.

It is also noted that in many applications, the microlith layers will be circular disks cut from flat sheets of fine mesh screen or expanded metal. This operation may result in a significant quantity of leftover scrap. Further, if the catalyst material is applied to the fine mesh at the time the mesh is manufactured, the cost of the leftover scrap could be very expensive.

Further problems occur with prior art catalyst support designs when applied to catalytic combustors used in gas turbine engines. Typical catalytic combustors operate in what is known as the homogenous gas phase reaction region of catalyst operation. In this region, most of the chemical reactions take place in the freestream off of the catalyst surface. The catalyst contributes to the overall reaction by reacting with a small portion of the total reactant stream to promote the formation of chemical radicals. These radicals in turn increase the reaction rate of the chemical species reacting in the freestream.

However, when gas turbines are operated at low power outputs, the catalytic combustor may be forced to operate in the slower mass transfer limited range (described hereinabove) due to cooler operating temperatures. Since gas turbine catalytic combustors are typically designed for minimum volume, the combustor may not have sufficient catalyst surface area to operate efficiently in the mass transfer limited region.

SUMMARY OF THE INVENTION

It is therefore an object of the present invention to provide an improved microlith catalyst system which reduces susceptibility of damage due to thermal stress.

It is further an object of the present invention to provide a microlith catalyst bed which has improved durability and reliability with reduced cost of manufacture.

In accordance with the present invention, a conical microlith catalytic reaction system for the conversion of carbon containing compounds comprises a housing made from an insulating material having an inner hub and an outer shroud. A conical shaped microlith catalyst bed is formed from a spiral wound flat helix wire cloth, with the spiral windings of the wire cloth located in the housing between the inner hub and the outer shroud, and wound to form a uniform cone angle less than 90° relative to the respective surfaces of the inner hub and outer shroud. The carbon containing compounds pass axially through each spiral winding layer of the wire cloth, and the uniform cone angle in the spiral windings allows the inner hub and outer shroud to axially translate relative to each other to prevent buckling of the spiral windings due to thermal stress generated by the catalyst bed becoming hot.

In further accordance with the present invention, the spiral wound microlith catalyst bed comprises a plurality of parallel warp wires coated with catalyst material, where each of the plurality of warp wires increases in length from a shortest length warp wire to a longest length warp wire. A plurality of woof wires coated with catalyst material are woven across the plurality of parallel warp wires. The plurality of warp wires and the plurality of woof wires thus form the spiral wound flat helix wire cloth.

In the microlith catalyst bed of the present invention, the shortest warp wire forms an inner radii of the flat helix, and the longest warp wire forms an outer radii of the flat helix. Some of the plurality of woof wires extend across the plurality of warp wires from the outer radii to the inner radii, and the remainder of the plurality of woof wires extend across the plurality of warp wires from the outer radii to a varying intermediate warp wire in between the outer radii and inner radii. To facilitate electrical heating of the microlith catalyst bed, a first electrical contact means is connected to one end of the flat helix wire cloth, and a second electrical contact means is connected to the other end of the flat helix wire cloth. The first and the second electrical contact means provide connection to an external power source for passing an electrical current through the flat helix wire cloth. An insulator means is further placed in between the spiral windings of the wire cloth to provide electrical insulation of adjacent layers. The insulator means can be in the form of a plurality of ceramic cloth rings, or a spiral wound ceramic cloth.

The present invention will be more fully understood upon reading the following detailed description of the preferred embodiment in conjunction with the accompanying drawings.

DETAILED DESCRIPTION OF THE PREFERRED EMBODIMENT(S)

Figure 1:
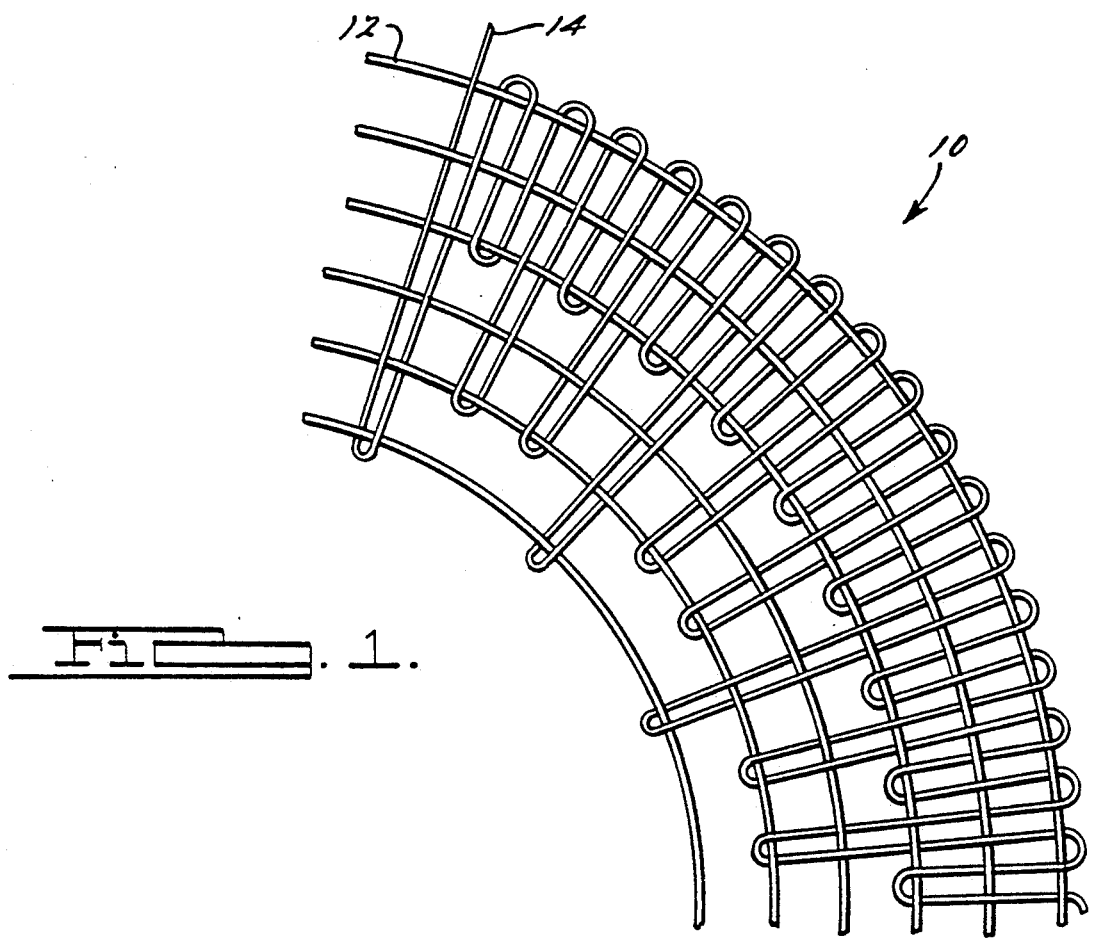
FIG. 1 is a diagram illustrating the microlith catalyst bed in accordance with the present invention.

Referring to FIG. 1 there is shown a spiral wound catalyst bed in accordance with the present invention comprising a single piece of wire cloth 10 formed into a flat helix (or flat coil) using unique polar weaving techniques. During the weaving process, varying lengths of parallel, longitudinal fibers or wires 12 (known as warp elements) of the cloth 10 are fed into a loom. Warp wires 12 at the inner radii of the flat helix will have a lower feed rate than the warp wires at the outer radii.

Cross-weave filler fibers or wires 14 (shown in the drawings as a single continuous fiber) are woven through the warp wires 12 to form the cloth 10. The filler wires or fibers 14 are also known as woof wires or fibers. The woof wires 14 are woven so that some woof wires wind from the outer to the inner radii of the flat helix, and other woof wires only wind from the outer radii to an intermediate warp wire 12 in the helix. The intermediate warp wire varies for each adjacent woof wire 14. This weaving pattern results in a nearly uniform fiber or wire density in the cloth 10 as it is wound into the helix. Also, the helix will be free of any wrinkles.

All wire or fiber used to fabricate the wire cloth 10 can be treated (coated) with a catalyst material before the weaving process is performed. This significantly reduces the complexity of the catalyst coating process. Platinum, palladium, iridium, rhodium or other metals applied to stainless steel wire are all examples of suitable catalysts, but are not to be construed as limiting. In many applications, stainless steel or other alloy will provide a sufficient catalyst without requirement of an additional catalytic coating.

Figure 2:
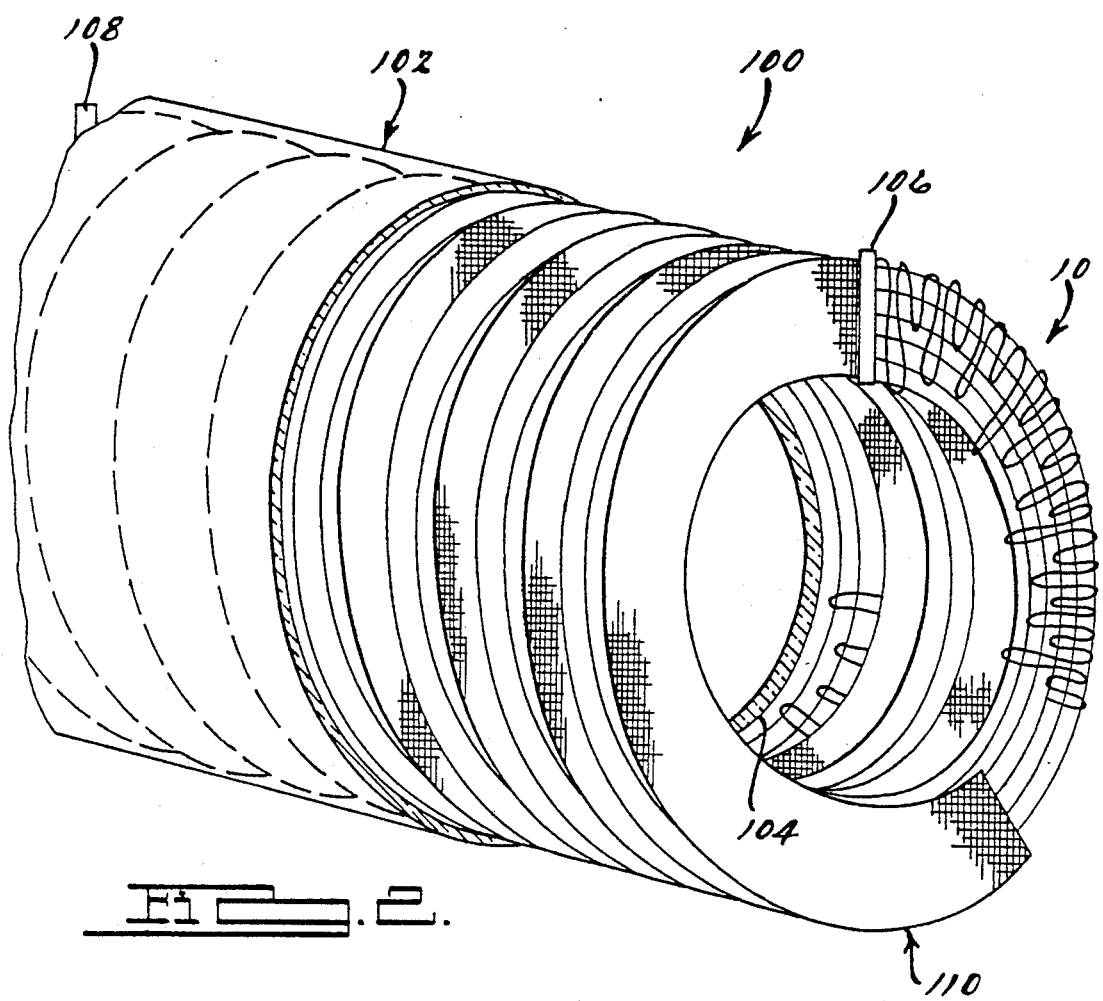
FIG. 2 is a diagram illustrating a conical catalytic reaction system utilizing the microlith catalyst bed of the present invention.

Referring now to FIG. 2 there is shown a catalytic reaction system 100 utilizing the wire cloth catalyst bed 10 of FIG. 1. It is noted the woof and warp wires of the wire cloth in FIG. 2 have been shown in exaggerated size for illustrative purposes. The flat helix (or flat coil) wire cloth 10 is sealed within a ceramic sleeve or housing. The ceramic sleeve comprises an outer ceramic shroud 102 and an inner ceramic hub 104. The ceramic sleeve controls the spacing between the respective layers or coils of the cloth helix 10 and will also electrically insulate the catalyst bed from any type of mounting container used in the application of the catalytic reaction system 100. For example, the ceramic inner hub 104 and the ceramic outer shroud 102 can be molded in a shape which would prevent movement of the cloth helix layers relative to their respective interspacing when the cloth helix is positioned in the ceramic sleeve. This can be achieved such as by providing inwardly positioned protrusions (e.g. see the dotted lines in FIG. 2) integrally molded with the inner hub 104 and the outer shroud 102, thereby forming ceramic barriers in between respective layers of the cloth helix 10. The ceramic protrusions would be molded in a spiral configuration to conform with the spiral layers of the helix cloth in a thread-like manner.

To facilitate electrical heating of the catalyst bed, a pair of radial bus bars 106 and 108 are attached to the leading and trailing ends of the wire cloth 10. Electrical current is applied at bus bar 106 and conducted through the length of the wire cloth 10 via the warp wires 12. Bus bar 108 provides a complete path for the electrical current back to the power source.

The conductivity of the warp wires 12 must be uniform from inside to outside radii in order to obtain a uniform current density across the entire radius of the catalyst bed. Since the inner radii warp wires will be considerably shorter in length than the outer radii warp wires, the gauge of each respective warp wire can be varied to achieve the desired electrical conductivity.

Figure 3:
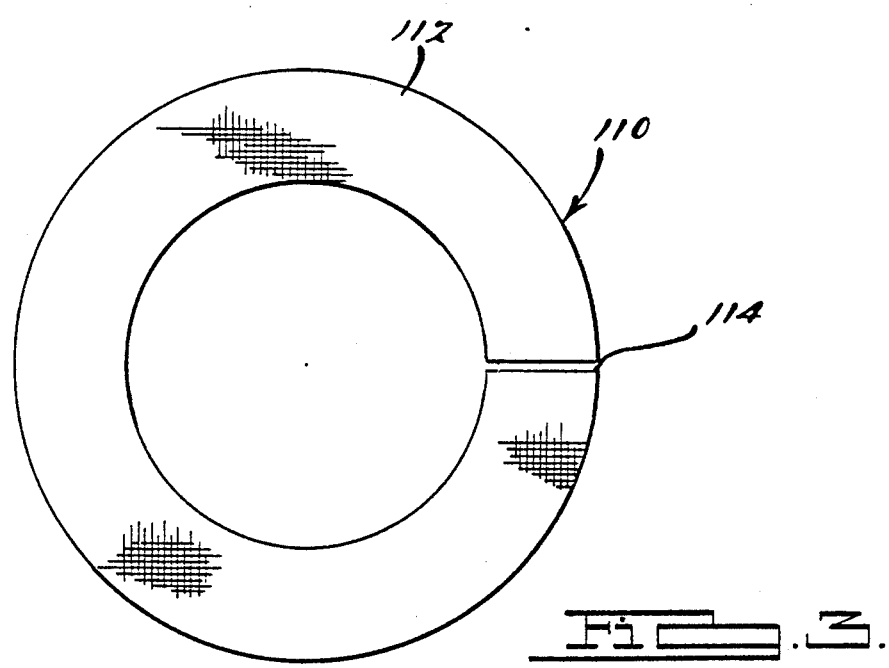
FIG. 3 is a diagram illustrating a ceramic cloth insulation ring in accordance with the present invention.

Electrical insulation between the respective layers in the wire cloth helix is achieved by insertion of a ring 110 intermediate each layer of the helix. Each ring 110 is preferably woven from a high temperature, machine sewable ceramic fiber thread. More specifically, one preferred arrangement for forming the insulator rings 110 according to the present invention is shown in FIG. 3 as a plain weave, high temperature ceramic fiber cloth 112 having 0.020 in (0.051 cm) diameter thread and an intermediate spacing of 0.125 in (0.318 cm) between center lines in both fiber weave directions. A material such as colloidal silica is subsequently applied to the cloth upon completion of the weaving to rigidize and maintain the fibers in position.

The ceramic cloth is then cut into circular rings 110 having an inner diameter slightly less than the inner diameter of the wire cloth helix, and an outer diameter slightly greater than the outer diameter of the wire cloth helix. Each ring 110 is then radially cut at a location 114 to permit the ring 110 to be inserted in between each turn of the wire cloth helix.

In assembling the catalytic reaction system 100, the inside and outside portions of the alternating layers of wire cloth catalyst bed and ceramic insulation cloth are coated with a ceramic potting compound. As each layer is coated, the potting material will merge to respectively form the continuous inner ceramic hub 104 and outer ceramic shroud 102. Since each ceramic insulator ring 110 slightly overlaps both the inner and outer diameters of the turns in the wire cloth helix, the adjacent turns will be sufficiently separated to achieve the desired electrical insulation.

In an alternative embodiment, the ceramic insulating cloth can be suitably formed by spiral weaving a set of ceramic fibers in a manner similar to the spiral wound wire cloth 10 described hereinabove. The separate insulating helix and wire cloth helix can then be appropriately positioned such as by a twisting action to form the desired alternating layers of wire cloth.

Figures 4A, 4B:
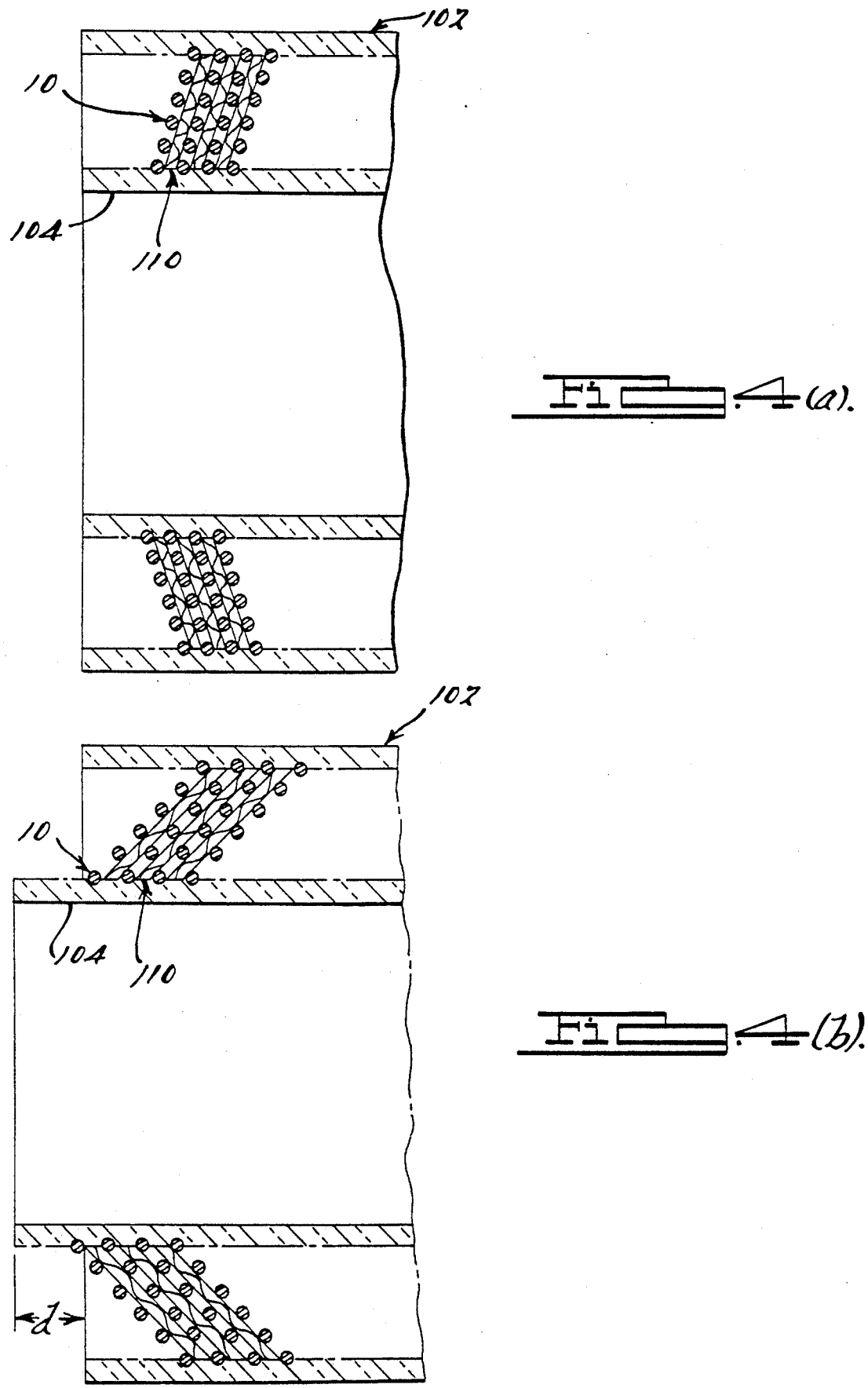
FIGS. 4(a) and (b) are diagrams illustrating the axial translation of the conical ceramic housing to prevent buckling of the microlith catalyst bed in accordance with the present invention.

In further accordance with the present invention, the layers of catalyst bed helix are preferably inclined at a uniform angle less than 90° relative to the respective surfaces of the inner hub 102 and outer shroud 104, such as by a 45° angle as shown in FIG. 4(a), to prevent any stress caused by thermal expansion of the wire cloth fibers from randomly buckling the helix layers. If the wire cloth helix layers are in an uninclined cylindrical configuration, the buckling of the wire cloth helix layers can potentially create electrical short circuits if adjacent layers of the helix come into contact.

However, the inclining of the wire cloth helix coils at a uniform angle allows either the outer shroud 102 or the inner hub 104 to axially displace relative to the other upon thermal stress of the wire cloth (i.e. the catalyst bed). The axial displacement of the outer shroud 102 relative to the inner hub 104 is illustrated by $d$ in FIG. 4(b). The above described spiral weaving technique used for forming the wire cloth catalyst bed in accordance with the present invention is adjusted either during or upon completion of the weaving, to tighten the helical turns thereby adjusting the inner and outer diameters of the wire cloth to achieve the desired cone configuration for the catalytic reaction system 100 shown in FIGS. 4(a) and 4(b). This tightening process can be accomplished either manually or with an automated process. For example, in one preferred embodiment a wire cloth which would have a 2.6 in ($\approx 6.6$ cm) inner diameter × 4.0 in ($\approx 10.2$ cm) outer diameter can be wound into a cone having a 1.5 in ($\approx 3.8$ cm) inner diameter × 3.0 in ($\approx 7.6$ cm) outer diameter and $\approx 45°$ cone angle.

The above described catalytic reaction system 100 is primarily applicable to automotive catalytic converters. Electrical heating is utilized to achieve rapid lightoff of the catalyst bed. Electrical conductivity of the cloth can be adjusted by changing the overall length of the cloth and by the selection of wire size and spacing used to make the cloth.

The present invention is also applicable to improving catalytic combustors used in gas turbine engines. High heat release rates for gas turbine type catalytic combustors have been demonstrated when the combustor exit temperature is maintained above 2000° F.. When the engine power level is reduced due to part load operation to the point where the combustor exit temperature drops below 1800° F., the combustor efficiency will begin to drop. However, the spiral wound microlith catalyst bed of the present invention achieves significantly higher combustion efficiency while operating at lower temperatures than conventional monolith type catalyst beds. This permits the small catalyst bed volume required for high power turbine operation to also be utilized in part load operation.

Several advantages are achieved by the spiral wound microlith catalyst bed of the present invention. The catalyst bed will have a very uniform electrical heating distribution that will reduce thermal stresses caused by uneven heating. Even if thermal stress does occur, the present invention allows either the outer shroud or inner hub to axially translate to prevent buckling of the spiral windings in the wire cloth. Further, there is no leftover scrap due to the flat helix wire cloth design. This significantly reduces the cost of raw materials. Durability and reliability are also improved because there are only two electrical connections required for heating the entire catalyst bed.

It will be understood that the foregoing description of the preferred embodiment of the present invention is for illustrative purposes only, and that the various structural and operational features herein disclosed are susceptible to a number of modifications and changes, none of which departs from the spirit and scope of the present invention as defined in the appended claims.

We claim:

1. A conical microlith catalytic reaction system for the conversion of carbon containing compounds comprising:
   a housing made from an insulating material having an inner hub and an outer shroud;
   a conical shaped microlith catalyst bed formed from a spiral wound wire cloth, the spiral windings of said wire cloth located in said housing between said inner hub and said outer shroud and wound to form a uniform cone angle less than 90° relative to the respective surfaces of said inner hub and said outer shroud, wherein the carbon containing compounds pass axially through each winding of wire cloth, and the uniform cone angle in the spiral windings of said wire cloth allowing said inner hub and said outer shroud to axially translate relative to each other to prevent buckling of the spiral windings due to thermal stress generated by said catalyst bed becoming hot.

2. The conical microlith catalytic reaction system of claim 1 wherein said microlith catalyst bed comprises:
   a plurality of parallel warp wires coated with catalyst material, each of said plurality of warp wires increasing in length from a shortest length warp wire to a longest length warp wire;
   a plurality of woof wires coated with catalyst material woven across said plurality of parallel warp wires, wherein said plurality of warp wires and said plurality of woof wires form said spiral wound flat helix wire cloth.

3. The conical microlith catalytic reaction system of claim 2 wherein said shortest warp wire forms an inner radii of said flat helix and said longest warp wire forms an outer radii of said flat helix, some of said plurality of woof wires extending across said plurality of warp wires from said outer radii to said inner radii, and the remainder of said plurality of woof wires extending across said plurality of warp wires from said outer radii to a varying intermediate warp wire in between said outer radii and said inner radii.

4. The conical microlith catalytic reaction system of claim 1 further comprising a first electrical contact means connected to one end of said wire cloth, and a second electrical contact means connected to the other end of said wire cloth, wherein said first and said second electrical contact means provide connection to an external power source for passing an electrical current through said wire cloth to electrically heat said microlith catalyst bed.

5. The conical microlith catalytic reaction system of claim 4 further comprising an insulator means placed in between the spiral windings of said wire cloth to provide electrical insulation of adjacent windings.

6. The conical microlith catalytic reaction system of claim 5 wherein said insulator means comprises a plurality of rings formed from woven ceramic fiber thread, said plurality of rings each having a radial opening to facilitate placement of said rings in between the spiral windings of said wire cloth.

7. The conical microlith catalytic reaction system of claim 5 wherein said insulator means comprises a spiral wound ceramic cloth, with each of the spiral windings in said ceramic cloth being positioned in between adjacent spiral windings of said wire cloth to form alternating layers of wire cloth and ceramic cloth.

* * * * *